(12) United States Patent
Gardner et al.

(10) Patent No.: US 8,164,304 B2
(45) Date of Patent: Apr. 24, 2012

(54) ELECTRICAL APPLIANCE AND CHARGER

(75) Inventors: Joseph P. Gardner, North Ridgeville, OH (US); Angelo Kotsis, Marrickville (AU); Michael S. Squires, Ryde (AU); Timothy Rugendyke, Woy Woy (AU)

(73) Assignee: Eveready Battery Company, Inc., St. Louis, MO (US)

( * ) Notice: Subject to any disclaimer, the term of this patent is extended or adjusted under 35 U.S.C. 154(b) by 901 days.

(21) Appl. No.: 11/749,404

(22) Filed: May 16, 2007

(65) Prior Publication Data
US 2008/0284374 A1   Nov. 20, 2008

(51) Int. Cl.
*H02J 7/00* (2006.01)
(52) U.S. Cl. .................. 320/115; 320/107; 362/183
(58) Field of Classification Search .......... 320/107, 320/115; 362/183
See application file for complete search history.

(56) References Cited

U.S. PATENT DOCUMENTS

| | | | |
|---|---|---|---|
| 4,092,580 A * | 5/1978 | Prinsze | 320/115 |
| 5,008,785 A | 4/1991 | Maglica et al. | |
| 5,121,308 A | 6/1992 | Maglica et al. | |
| D334,379 S | 3/1993 | Sharrah et al. | |
| 5,267,130 A | 11/1993 | Maglica et al. | |
| 5,410,237 A | 4/1995 | Sharrah et al. | |
| 5,432,689 A | 7/1995 | Sharrah et al. | |
| 5,455,752 A | 10/1995 | Maglica et al. | |
| 5,528,472 A | 6/1996 | Maglica et al. | |
| 5,836,672 A | 11/1998 | Maglica et al. | |
| 5,895,440 A * | 4/1999 | Proctor et al. | 702/63 |
| 6,086,219 A | 7/2000 | Maglica et al. | |
| RE37,092 E | 3/2001 | Sharrah et al. | |
| 6,296,368 B1 | 10/2001 | Maglica et al. | |
| 6,313,604 B1 * | 11/2001 | Chen | 320/114 |
| 6,457,840 B2 | 10/2002 | Maglica et al. | |
| 6,652,115 B2 | 11/2003 | Sharrah | |
| 7,059,744 B2 | 6/2006 | Sharrah | |
| 2002/0012245 A1 | 1/2002 | Maglica et al. | |
| 2003/0043576 A1 | 3/2003 | Maglica et al. | |
| 2006/0120069 A1 | 6/2006 | West | |

(Continued)

FOREIGN PATENT DOCUMENTS

EP    0679237 B1    9/1997

(Continued)

OTHER PUBLICATIONS

Patent Cooperation Treaty (PCT), International Search Report and Written Opinion for Application No. PCT/ US2008/005891, filed May 8, 2008, mailed Oct. 31, 2008, Korean Intellectual Property Office, Korea.

(Continued)

*Primary Examiner* — Edward Tso
*Assistant Examiner* — Aaron Piggush
(74) *Attorney, Agent, or Firm* — Michael C. Pophal (57) ABSTRACT

An apparatus includes a charger (104) and a portable appliance such as a flashlight (102). The flashlight includes first and second flashlight electrical contacts. The charger includes first (122*a*) and second (122*b*) flashlight supports or jaws that support the flashlight in a flashlight receiving region of the charger (104). The flashlight supports (122) include a tapered surface that varies a dimension of the battery receiving region as a function of a longitudinal position of the flashlight supports (122). The charger (104) also includes a light source (120) that indicates when the flashlight (102) has been correctly inserted in the charger (104).

22 Claims, 8 Drawing Sheets

U.S. PATENT DOCUMENTS

| | | | |
|---|---|---|---|
| 2006/0208695 | A1 | 9/2006 | Weinstein et al. |
| 2006/0232239 | A1 | 10/2006 | Maglica et al. |
| 2007/0064354 | A1 | 3/2007 | West |
| 2007/0069689 | A1* | 3/2007 | Shum .......................... 320/114 |

FOREIGN PATENT DOCUMENTS

| | | | |
|---|---|---|---|
| EP | 1203911 | A2 | 5/2002 |
| EP | 0768724 | B1 | 6/2002 |
| EP | 1203911 | A3 | 10/2003 |
| EP | 1203911 | B1 | 3/2006 |
| KR | 20-1998-037279 | U | 9/1998 |
| WO | 9416264 | A2 | 7/1994 |
| WO | 2005060715 | A2 | 7/2005 |
| WO | 2006063061 | A2 | 6/2006 |
| WO | 2006113461 | A2 | 10/2006 |

OTHER PUBLICATIONS

Streamlight Supply, Streamlight Poly Stinger Flashlight w/AC Fast Charger—Black product information, downloaded May 3, 2007, 4 sheets, http;//www.streamlightsupply.com/detail.aspx?ID=1050.

Surefire LLC, AC/DC Charger, Rapid C911 product information, downloaded May 15, 2007, 2 sheets, http://www. surefire.com/maxexp/main/co_disp/displ/carfnbr/98/prrfnbr/338.

Surefire LLC, AC/DC Charger, Rapid CN211 product information, downloaded May 15, 2007, 2 sheets, http://www. surefire.com/maxexp/main/co_disp/displ/carfnbr/98/prrfnbr/335.

Surefire LLC, AC/DC Charger, Rapid CN411 product information, downloaded May 15, 2007, 2 sheets, http://www. surefire.com/maxexp/main/co_disp/displ/carfnbr/98/prrfnbr/336.

Surefire LLC, 10X Dominator Dual Power Illuminator 60/500+ Lumens manual, downloaded May 15, 2007, 11 sheets, http://www.surefire.com/images/manuals/10x_manual.pdf.

MAG Instruments Inc., Magcharger The Professional Flashlight Owner's Manual, 2005, 40 pages.

Streamlight, Stinger Series Operating Instructions, Sep. 2006, Rev. C, 12 sheets.

Streamlight, Stinger HP Model No. HP-75503 Photographs and Information, May 3, 2007.

MAG Instruments Inc., Magcharger Model No. RX1019 Part No. 106-000-350 Photographs and Information, May 3, 2007.

* cited by examiner

ELECTRICAL APPLIANCE AND CHARGER

BACKGROUND

The following relates to chargers for electrical appliances, and especially to chargers for flashlights.

Secondary (rechargeable) batteries have become increasingly popular as an energy source for flashlights and other portable electrical appliances. One factor that influences the acceptance of these batteries, and the appliances that use them, is the convenience and ease of use of the requisite charger. In some cases, convenience can be enhanced when the batteries need not be removed from the appliance and can be charged in situ.

One flashlight and charging unit is disclosed in U.S. Pat. No. RE37,092 entitled Flashlight and Recharging System Therefor. The flashlight includes a barrel and an enlarged head. A guide plate located on the enlarged head provides an alignment feature that aligns a pair of flashlight charging contacts with a pair of terminals in the charging unit for releasably holding the flashlight in its charging receptacle. The charging receptacle grips the head portion of the flashlight with a pair of spring-loaded jaws. The flashlight is inserted in the receptacle by pressing the flashlight barrel between the jaws and moving the head of the flashlight axially.

According to the '092 patent, locating the guide plate on the head of the flashlight provides greater leverage for removing the flashlight from the charging unit than would otherwise be available if the contacts and guide plate were located at a lower position on the flashlight, such as on a tapered portion or the barrel. The charging unit also includes a single forward facing light emitting diode (LED) that, according to the patent, indicates when the flashlight is being charged.

The assignee of the '092 patent also markets a flashlight under the designation Stinger® HP™. The Stinger HP flashlight includes an enlarged, generally conical head and a cylindrical barrel. The flashlight also includes an enlarged body portion located immediately beneath the conical head. The guide plate and charging contacts are located on the enlarged body portion.

Another example of a flashlight and charging base is disclosed in U.S. Patent Publication No. 2006/0232239A1, published Oct. 19, 2006. The flashlight includes a pair of annular charging contacts that extend circumferentially around the barrel of the flashlight. The charging base includes a corresponding pair of contacts that serve the dual function of holding the flashlight in the charger and conducting electrical energy to the flashlight contacts. The charging base also includes a head section adapted to receive the enlarged head of the flashlight so that the corresponding flashlight and charger contacts are axially aligned. Forward facing red and green charge status LEDs are located near an LED display located at the front of the charging base.

The assignee of the '239 Publication also markets a flashlight and charging base under the designation Magcharger® Model No. RX1019. While the RX1019 charging base does not include an alignment recess, the contacts are located similarly to those disclosed in the '092 patent, and a pair of pivotally mounted jaws are located on either side of a flashlight barrel receiving area. The barrel causes the jaws to open when the flashlight is removed from the charging base; the jaws ordinarily remain open after the flashlight is removed. Reinserting the flashlight in the barrel receiving region causes the barrel to depress jaw portions located near the rear thereof, thus closing the jaws. A single red LED shines downwardly from the bottom of the base. The charging base also includes a head section similar to that disclosed in the '239 Publication.

While these devices allow the flashlight batteries to be recharged in situ, there remains room for improvement. For example, inserting the flashlights in and/or removing them from their respective charging units can require the application physical force sufficient to move the respective jaws. The application of such force can make it more difficult for the user to determine if the flashlight has been properly inserted. If not properly inserted, the batteries will not be charged, which unfortunately may not be noticed until the user has an immediate need for the flashlight.

SUMMARY

Aspects of the present invention address these matters, and others.

According to a first aspect, a charger charges a rechargeable energy source of a flashlight received in a flashlight receiving region of the charger. The charger includes a charger body, a first charger electrical contact that provides an electrical connection to a corresponding first flashlight electrical contact, a first longitudinally extending flashlight support, and a second longitudinally extending flashlight support. The second support, which is located opposite the flashlight receiving region from the first support and mounted for pivotal motion relative to the charger body, defines a flashlight receiving region radial dimension that varies as a function of the longitudinal position along the second support.

According to another aspect, an apparatus charges a rechargeable energy source of a flashlight received in a flashlight receiving region of the apparatus. The apparatus includes a body, a first jaw attached to the body for radial motion relative to the battery receiving region, and a second jaw attached to the body for radial motion relative to the battery receiving region. The first and second jaws cooperate to support the flashlight in the flashlight receiving region and define a battery receiving region radial taper.

According to another aspect, a charger that charges a rechargeable energy source of a flashlight received in a flashlight receiving region of the apparatus includes a charger body, a first longitudinally extending flashlight support attached to the body for motion relative to the battery receiving region, and a second longitudinally extending flashlight support located across the flashlight receiving region from the first flashlight support and attached to the body for motion relative to the battery receiving region. The first and second flashlight supports cooperate to support the flashlight in the flashlight receiving region. The apparatus also includes a diffuse light source that illuminates to indicate that a flashlight received in the flashlight receiving region is in electrical communication with the apparatus.

According to another aspect, a method includes receiving a flashlight in a flashlight receiving region of a charger. The flashlight includes a head and a rechargeable energy source. The charger includes first and second spaced apart flashlight supports that cooperate to support the flashlight in the flashlight receiving region. The method also includes sensing whether the flashlight is in electrical communication with the charger, and if the flashlight is in electrical communication with the charger, illuminating a diffuse light source of the charger.

According to another aspect, a method of manufacturing a charger that charges a rechargeable energy source of a flashlight received in a flashlight receiving region of the charger.

The method includes selecting from at least first and second versions of a component of a diffuse light source. The first version includes a first graphic visible to a user of the charger during the charging of the energy source. The second version includes a second, different graphic visible to the user during the charging of the energy source. The method includes installing the selected component on the charger.

Those skilled in the art will recognize still other aspects of the present invention upon reading and understanding the attached description.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
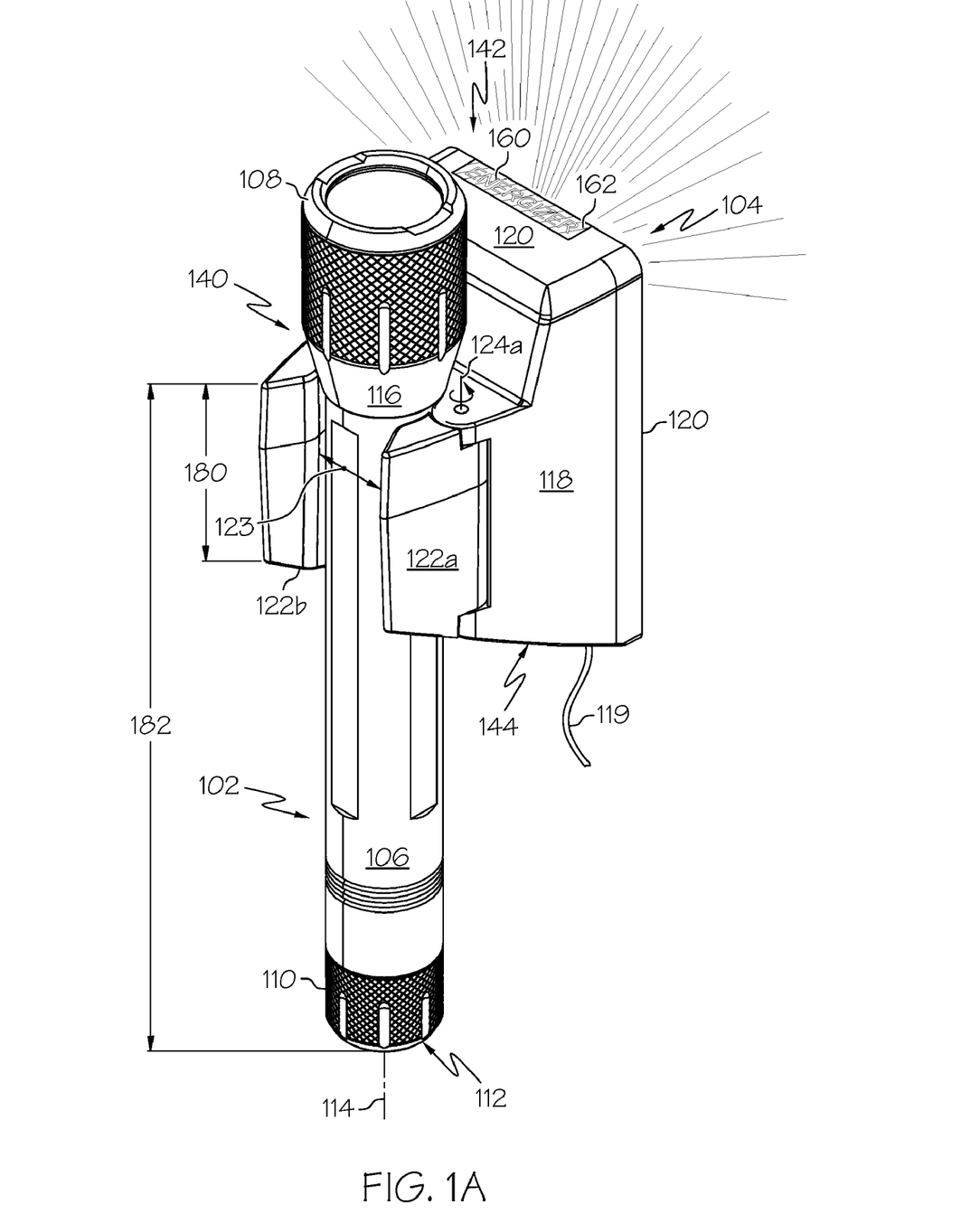
FIGS. 1A and 1B are respective perspective and right side views of a flashlight received in a charger.
Figure 1B:
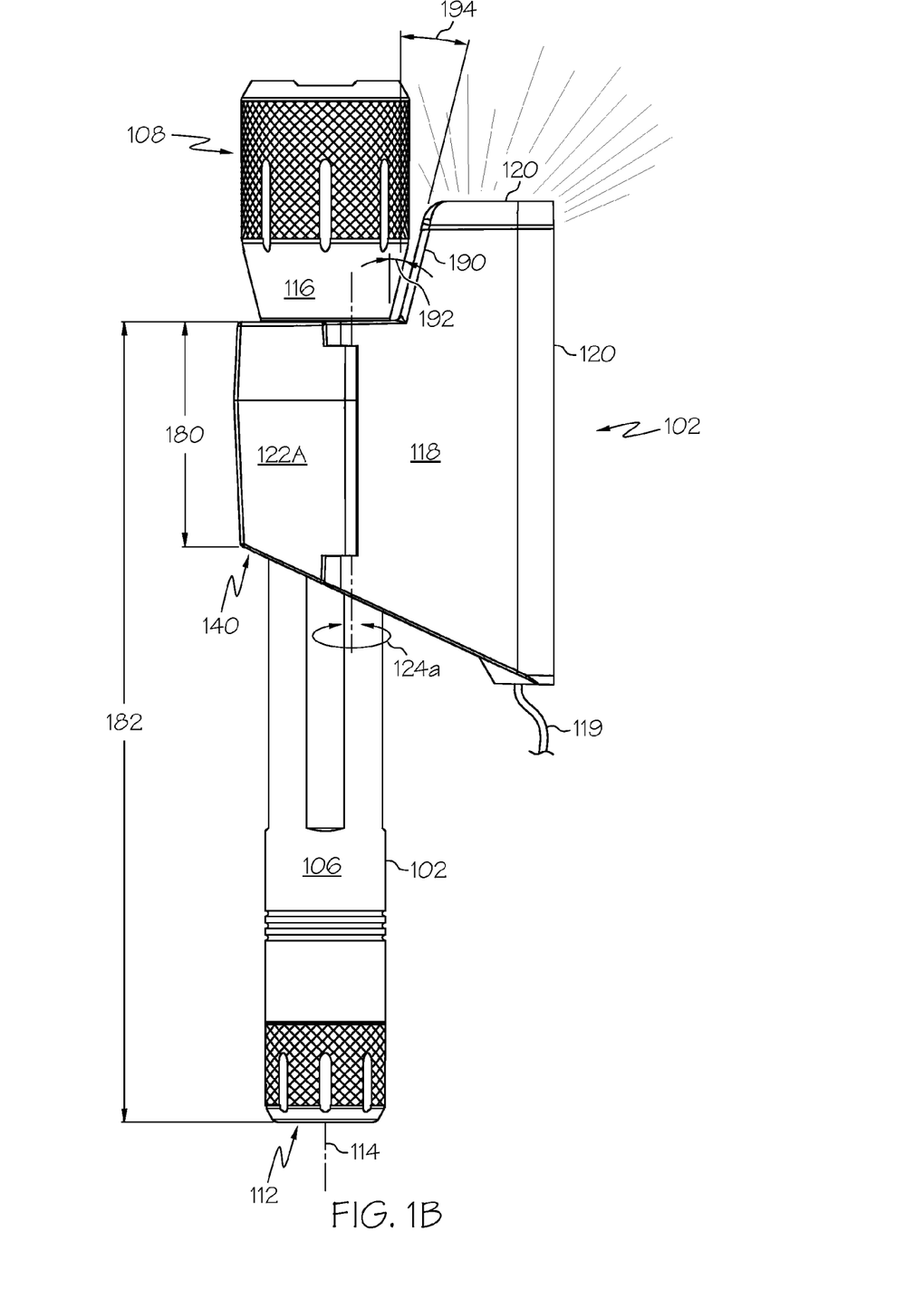

With reference to FIGS. 1A and 1B, an apparatus includes a flashlight 102 and a charger 104.

The flashlight 102 includes a housing having a generally cylindrical body or barrel 106 and an enlarged head 108. The body 106 includes a cavity that receives a rechargeable energy source. Suitable energy sources include lithium ion (LiIon), nickel metal hydride (NiMH), nickel cadmium (NiCad), or other secondary (rechargeable) batteries, capacitive energy storage devices, or other energy storage elements. The capacity and technology of the rechargeable energy source is selected based on factors such as desired performance, cost, and the like. In the illustrated embodiment, the flashlight 102 includes two (2) generally cylindrical, AA-size LiIon batteries.

A tailpiece 110, which is threadedly attached to the body 106 at the tail end of the flashlight, allows a user to selectively access the cavity, for example to insert or remove the batteries or other rechargeable energy source should replacement be required. Disposed at the tail end of the tailpiece 110 is a user control such as a switch 112 that allows the user to operate the flashlight 102 as desired. Note that the switch may also be located on the flashlight body 106 or the flashlight head 108.

The flashlight head 108 includes a light source such as one (1) or more light emitting diodes (LEDs), halogen lamps, incandescent lamps, or the like. The flashlight head 108 also includes a light management system such as a reflector and lens which, in one embodiment, cooperates with the light source to produce a light beam which projects from the head end of the flashlight 102 generally along its longitudinal axis 114.

The flashlight head 108 also includes a tapered, conical portion 116 having a larger diameter located nearer the head end of the flashlight 102 and a smaller diameter located nearer to the tail end of the flashlight. The flashlight head 108 is threadedly attached to the flashlight body 106 for rotation about the longitudinal axis 114. In one embodiment, rotating the flashlight head 108 relative to the flashlight body varies a characteristic of the light beam, for example to vary the spread or focus of the light beam. Alternatively or additionally, rotating the flashlight head 108 relative to the flashlight body 106 may serve to turn the flashlight on and off.

The charger 104 includes a flashlight receiving region 140 having a longitudinal axis that corresponds to the flashlight longitudinal axis 114. A polymeric charger body 118 includes a head end 142 and a tail end 144. The charger body 118 also includes a rear facing portion 120 that is configured for mounting to a generally planar surface such as a wall, either directly or via a suitable mounting bracket. Note that the surface need not be vertical and may be horizontal or otherwise inclined.

First 122a and second 122b polymeric, longitudinally extending flashlight supports located on opposite sides of the flashlight receiving region 140 extend generally forwardly from the charger body 118 and cooperate to support the flashlight body 106 and hence the flashlight 102 in the flashlight receiving region 140 for charging. As will be explained in further detail below, the flashlight supports 122 define a flashlight receiving region radial dimension that varies as a function of the longitudinal position along the supports 122.

The flashlight supports 122 are mounted for radial motion relative to (i.e., motion toward and away from) the flashlight receiving region 140. As illustrated in FIG. 1, the flashlight supports 122 are pivotally attached to the charger body 118 for motion about respective pivot axes 124a, 124b (axis 124b not being visible in FIG. 1), although attachment for linear or other motion is also contemplated. The flashlight supports 122 extend partially circumferentially around the flashlight 102 housing and define a forwardly facing gap 123 through which the flashlight 102 may be selectively inserted and/or removed, it being understood that the radial dimension of the gap is less than the diameter of the flashlight 102. The flashlight supports are preferably spring loaded or otherwise urged in the direction of the flashlight receiving region 140.

The charger 102 also includes a substantially planar, angled face 180 located behind and substantially adjacent to the flashlight conical portion 116. The conical portion 116 is angled radially away from the longitudinal axis by a first angle 192; the surface 180 is angled radially away from the longitudinal axis by a second angle 194. As illustrated, the first 192 and second 194 angles are equal.

The charger body 118 contains battery charging circuitry, and a power cord 119 connects the battery charging circuitry to a suitable external power source such as a conventional power cube connected to 120/240 volt alternating current (vac) power mains, a direct current (DC) power source such as an automotive 12 volt direct current (VDC) system, or the like.

Suitable charging circuits are known to those of ordinary skill in the art and are typically selected based on factors such as the requirements and characteristics of the rechargeable energy source, desired charger performance characteristics, and cost. In one embodiment, the charging circuitry is a timer based charging circuit. Preferably, the charging circuitry also includes a sensing function that senses when a rechargeable energy storage device is connected to the charger, for example by sensing a voltage or current at the charger electrical contacts.

The charger 104 includes a diffuse light source 120 located on the head end of the charger 104 in a region generally behind the flashlight receiving region 140. As illustrated, the indicator 120 illuminates substantially all of the head end 142 and head end portions of the front, rear, and sides of the charger body 118. Operation of the light source 120 is described in Table 1:

TABLE 1

| Rechargeable Energy Source | Human Visible Indicator 120 |
| --- | --- |
| Not connected to charging circuitry | Not illuminated |
| Connected/charging | Illuminated red |
| Connected/charge complete | Illuminated green |

The diffuse light source 120 may also blink to indicate an error condition, for example by blinking red in cases where the renewable energy source is connected but cannot be charged. Hence, the indicator is advantageously illuminated when the flashlight 102 is properly seated in the charger 104 for charging.

The charger 104 will now be further described with reference to FIGS. 2A, 2B, and 2C.

The charger body 118 includes a longitudinally extending, generally arcuate wall 202 that is located behind and generally facing the flashlight receiving region. Formed in the wall 202 is a head end facing flashlight alignment recess 204 that engages a corresponding alignment member located on the flashlight body 102. As illustrated in FIG. 1, the flashlight alignment recess 204 is generally U-shaped and includes first 206a and second 206a spaced apart, substantially vertical side walls and a substantially horizontal tail end wall 208. The vertical 206 and horizontal 208 walls are joined by first 210a and second 210b angled walls.

Disposed in the alignment recess 204 are first 212a and second 212b forward facing, longitudinally displaced electrical contacts. The contacts 212, which include generally hemispherical contact portions, are spring loaded or otherwise urged toward the front of the charger 104 so as to engage corresponding contacts located on the flashlight body 106 when the flashlight 102 is received by the charger 104 for charging.

In the illustrated embodiment, the flashlight supports 122 define a head end facing flashlight receiving region radial taper. More specifically, a radial dimension of the flashlight receiving region 140 at a location nearer to the head ends 240a, 240b of the flashlight supports 122 is greater than the radial dimension of flashlight receiving region 140 at a longitudinal position relatively nearer to the tail ends 242a, 242b of the flashlight supports. In the illustrated embodiment, the radial dimension varies as a substantially linear function of the longitudinal position and thus defines a linear taper, although non-linear tapers are also contemplated. Also as illustrated, the flashlight supports 122 define a tail end facing battery receiving region radial taper in which a radial dimension of the flashlight receiving region at a location nearer to the tail ends 242a, 242b of the flashlight supports 122 is greater than the radial dimension at a location nearer to the head ends 240a, 240b.

The dimension of the gap 123 varies as a function of the longitudinal position along the flashlight supports 122. The gap $123_H$ at a location nearer to the flashlight support head ends 240 is greater than gap $123_M$ such that the gap includes a head end facing taper. Likewise, the gap $123_T$ at a location nearer to the tail ends 242 has a dimension greater than the gap $123_M$ such that the gap 123 includes a tail end facing taper.

Figure 2A:
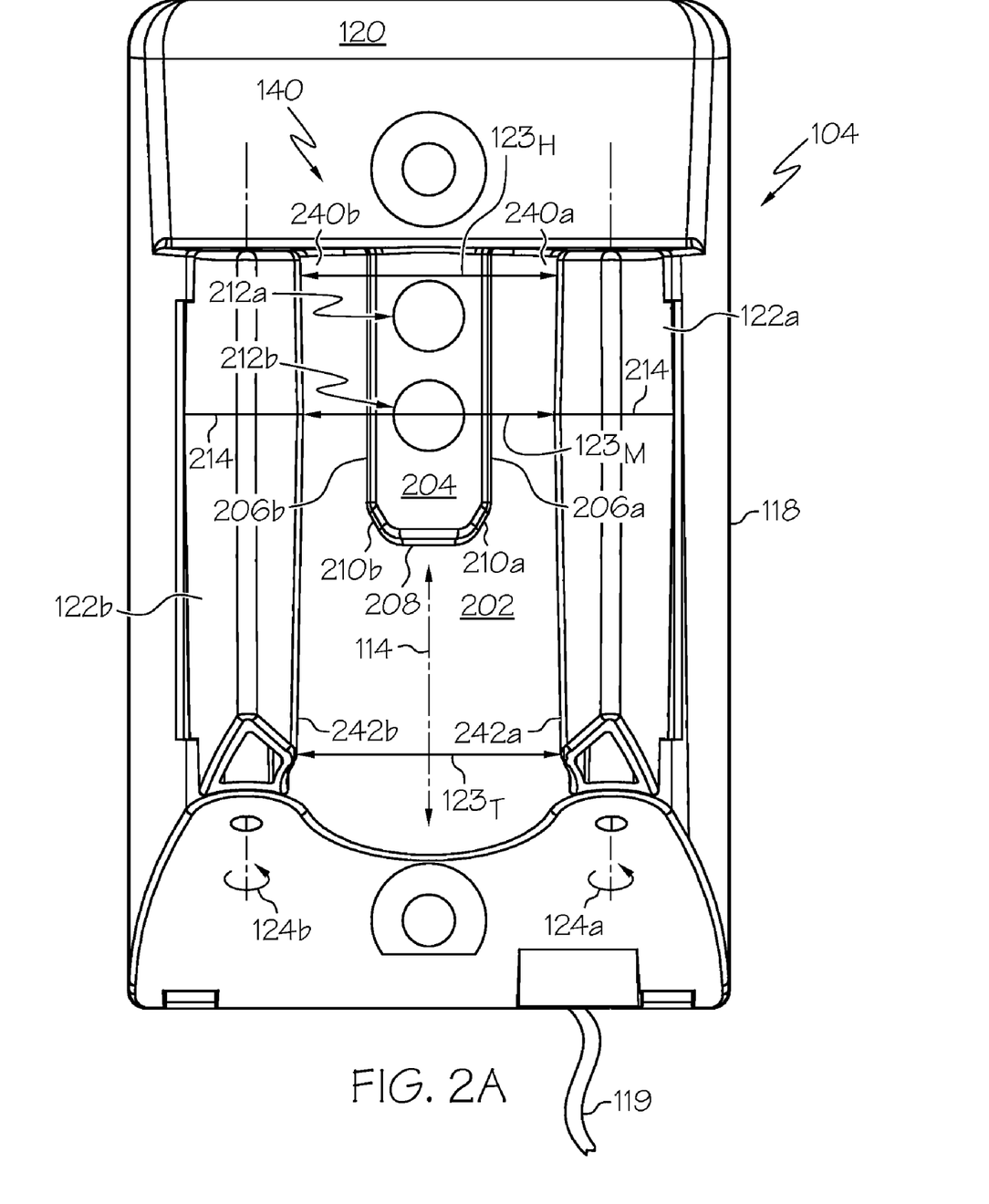
FIGS. 2A, 2B, and 2C are respective front, top, and right side views of a charger.
Figure 2B:
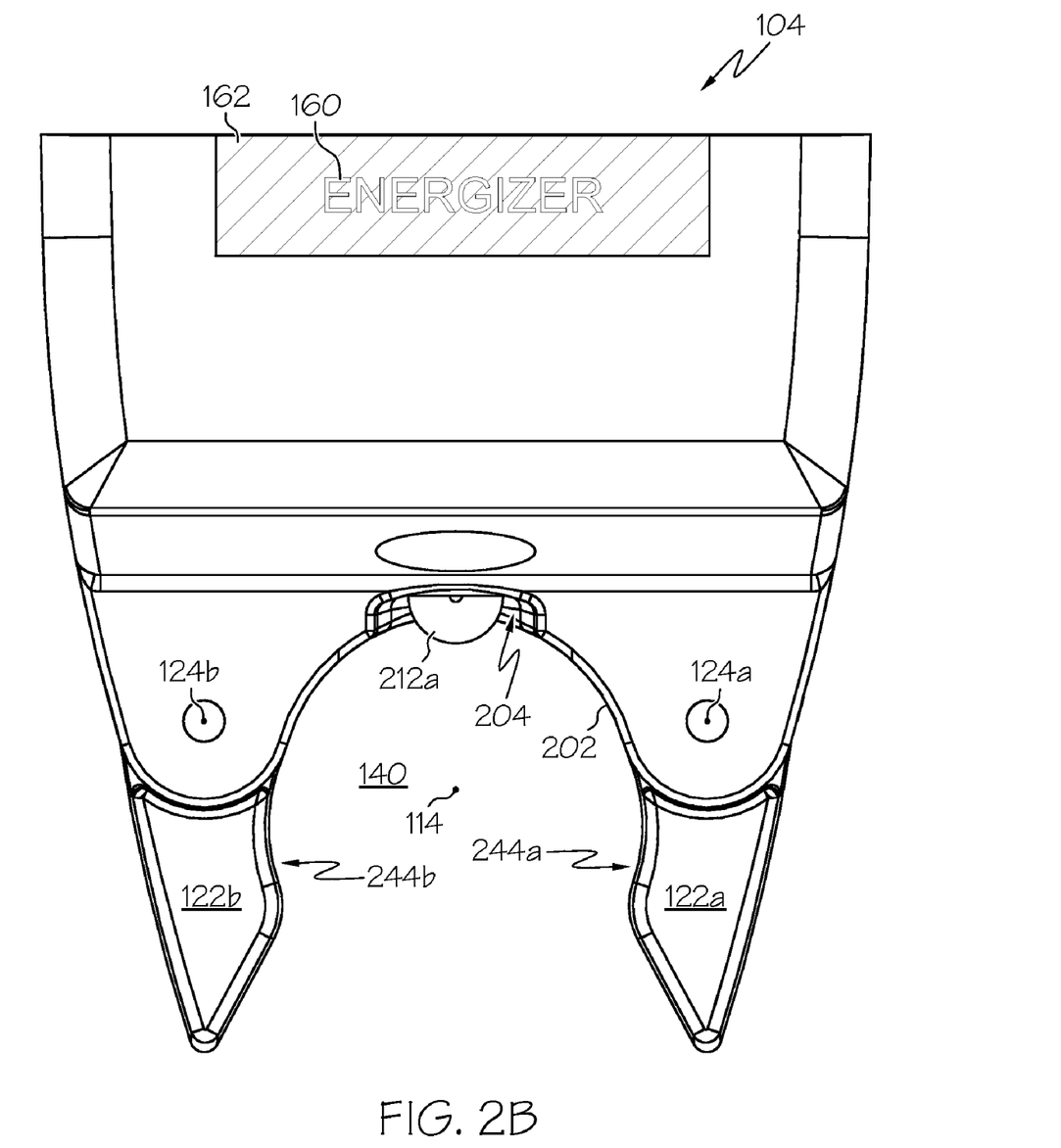
Figure 2C:
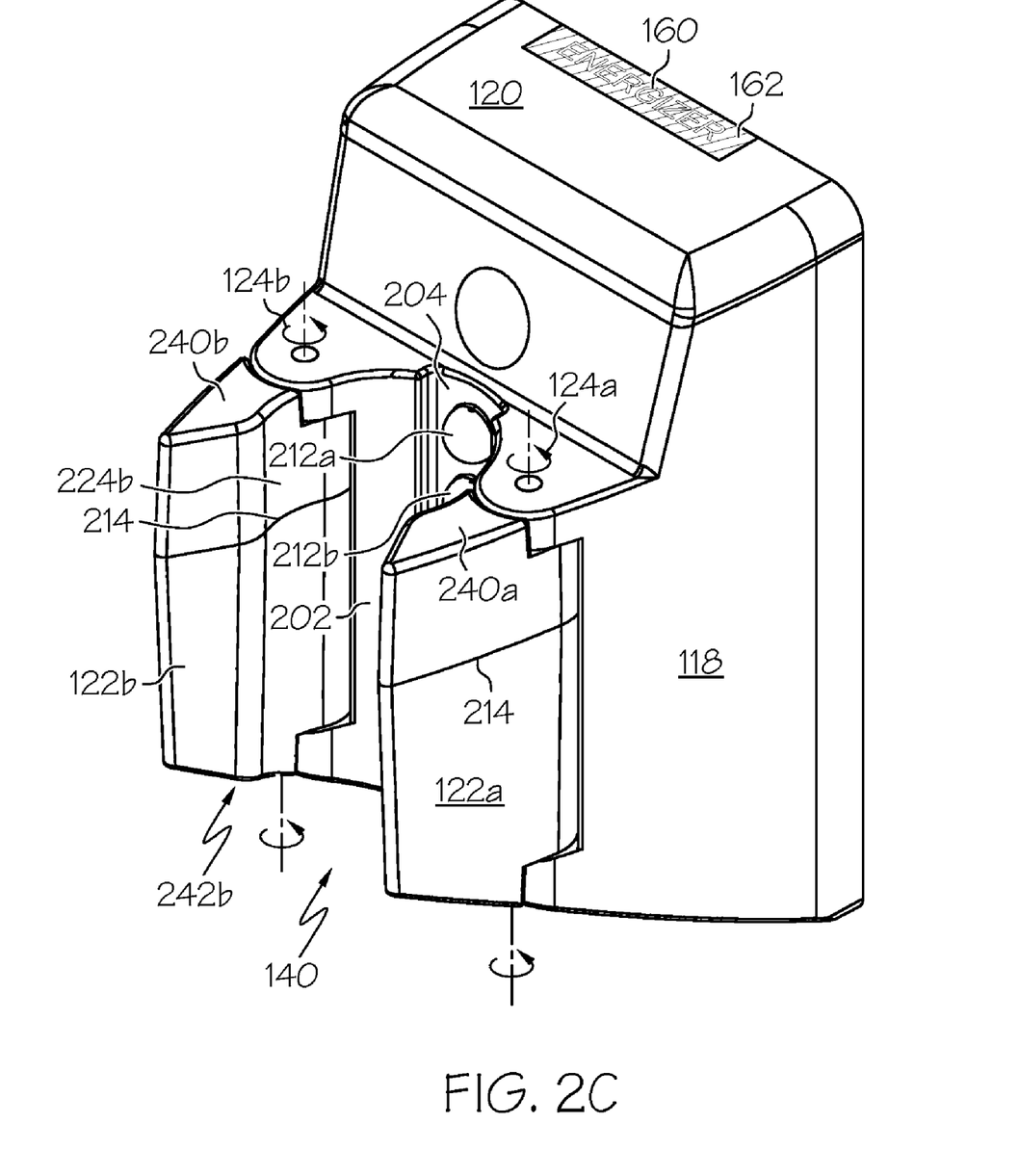

The various head end and tail end facing tapers can be seen with particular reference to FIGS. 2A and 2B. Turning first to FIG. 2B, the flashlight supports 122a, 122b include generally arcuate, flashlight receiving region facing surfaces 244a, 244b. Turning to FIG. 2A, the surfaces 244a, 244b are angled or inclined away from the flashlight receiving region 140 at an acute angle. Though facing the tail end rather than the head end, it will be understood that the tail end facing tapering is similar.

In the illustrated embodiment, the head end and tail end tapers both terminate at a common longitudinal position indicated as 214. Hence, the flashlight supports define a flashlight receiving region 140 radial dimension minimum which forms a curved line located at the position 214. Note that the tapers need not terminate at a common longitudinal position, in which case the minimum would form a curved surface extending in the longitudinal dimension. One or both of the head end and tail end facing tapers may also be omitted.

At least a portion of the minimum is preferably located in a region bounded in the longitudinal direction by the head and tail ends of the flashlight alignment recess, or even more preferably in the longitudinal region bounded by the contacts 212. Such an arrangement tends to ensure that the flashlight supports 122 urge the flashlight 102 alignment plate and contacts toward the alignment recess 204 and the charger contacts 212.

The flashlight supports 122 may be formed by an injection or other molding process. According to such an implementation, the molding draft angles may be used to provide the inclined surfaces and hence the desired tapers, with draft angles on the order of 1 to 3 degrees being common. In the embodiment illustrated in FIG. 2, the location 214 corresponds to the parting line of the molds used in the molding process. In this regard, it should be noted that the surfaces 244 need not be continuous surfaces and may include longitudinally extending ribs or other features.

Returning briefly to FIG. 1, the forward facing portions of the flashlight supports 122 have a longitudinal dimension 180 that is approximately twenty eight percent (28%) of the longitudinal dimension of the flashlight body 108 and about twenty one percent (21%) of the length of the flashlight 102.

Figure 3:
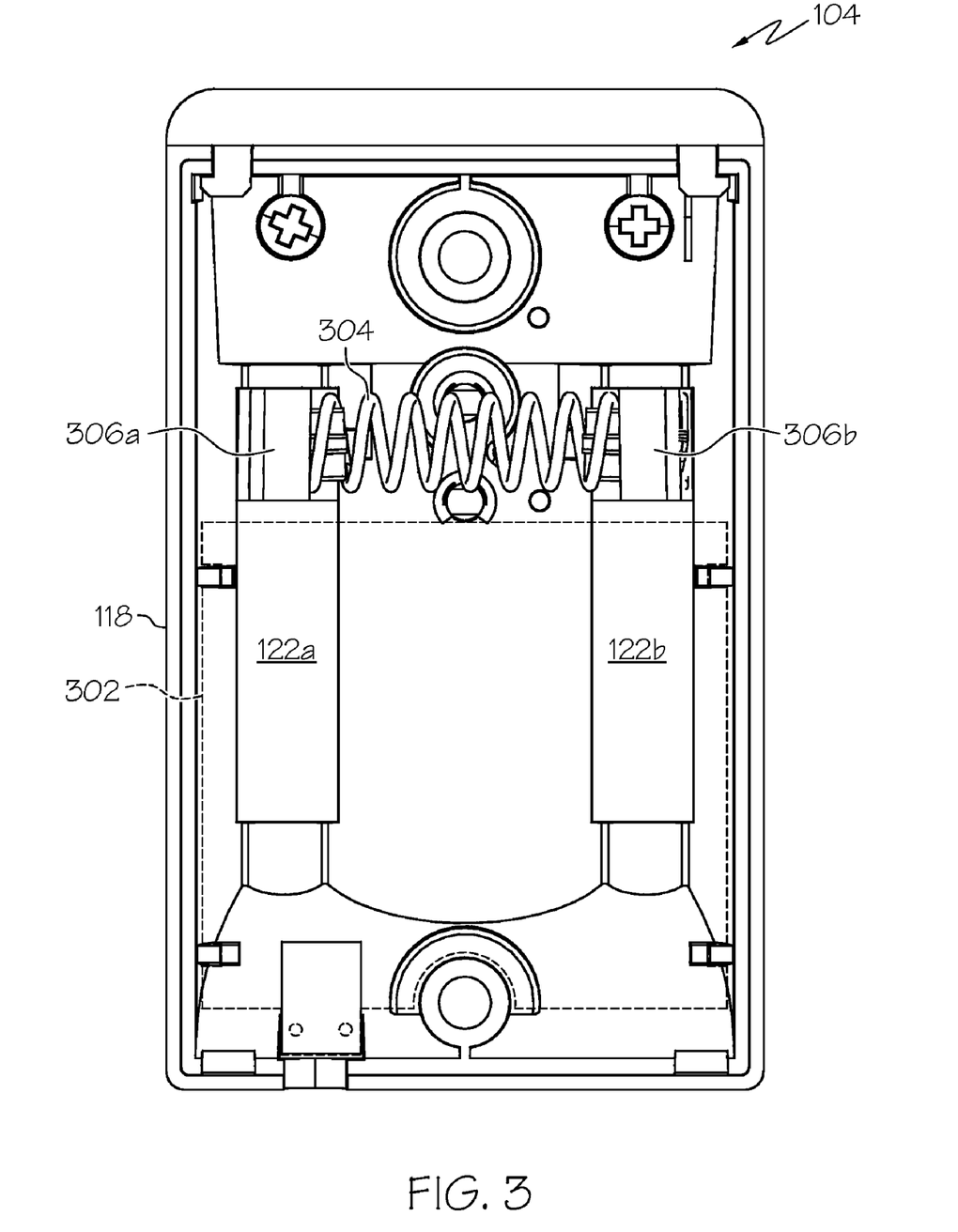
FIG. 3 is a rear view of a charger.

FIG. 3 shows a rear view of the charger 104 with a rear cover removed for clarity of illustration. The charging circuitry is carried by a circuit board 302 that is shown in phantom, again for clarity of illustration. The flashlight supports 122a, 122b include rearwardly facing arms 306a, 306b, respectively. A coil spring 304 urges the arms 306 outwardly, thus tending to urge the forward extending portions of the flashlight supports 122 toward the flashlight receiving region. In another embodiment, the spring is 124 is a generally W-shaped leaf spring that is heat staked or otherwise fastened to the charger body 118 in a region located generally between the arms 306.

Figure 4:
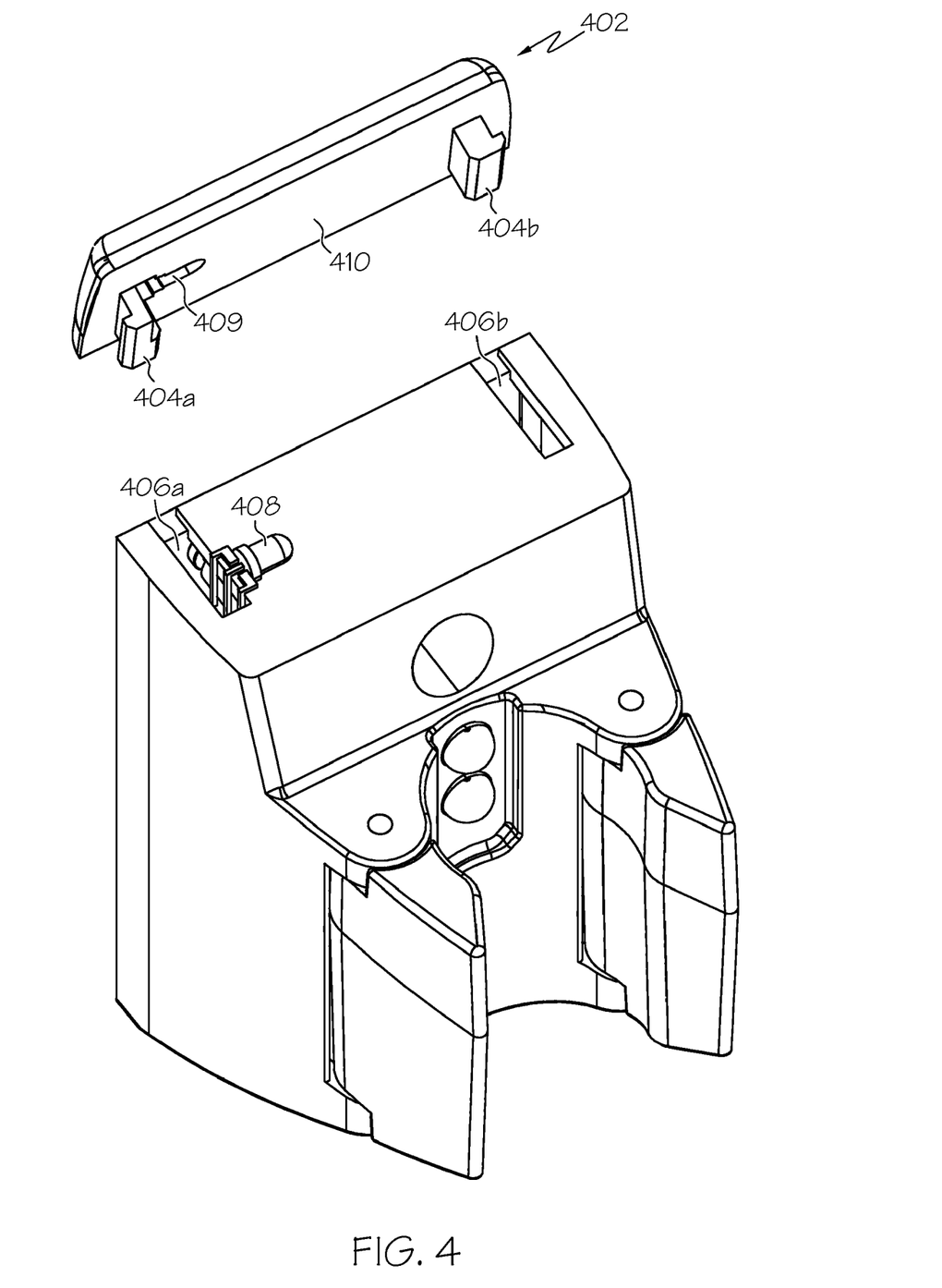
FIG. 4 depicts a human visible indicator.

The diffuse light source 120 will now be described with reference to FIGS. 1 and 4. As illustrated, an optical diffuser 402 is fastened at the head end the charger body 118 by way first and second latches 404a, 404b that snappingly engage corresponding catches 406a, 406b of the charger body 118. Other mechanical fasteners and fastening techniques are also contemplated, as are the use of suitable adhesives.

A dual color red/green LED 408 protrudes through an opening in the charger body 118 from a location near the periphery of the charger body 118 and is positioned to face generally laterally toward the center of the charger body 118. A corresponding material free region 409 is disposed in a charger body facing surface 410 of the diffuser 402. When the diffuser 402 is installed on the body 118, the LED 408 likewise protrudes into a hollow interior region of the diffuser 404, again facing generally laterally.

At least the head end and a portion of the front, rear, and sides of the diffuser 402 is molded or otherwise fabricated from an optically transmissive material such as an acrylic thermoplastic. A surface of the optically transmissive material is textured or otherwise pebbled so as to diffuse the light produced by the LED 408, with the texturing advantageously selected so that the head end of the charger 104 appears to glow when the LED 408 is illuminated.

The light source 120 may also present graphics 160 such as text and/or symbols. In one implementation, the graphics may be molded into the diffuser 402 by way of regions having greater or lesser thickness. As illustrated by the hatching in FIGS. 1, 2B, and 2C, an area 162 surrounding the graphics 160 may be coated with an optically opaque material so that the illuminated graphics 160 tend to contrast with a darker surrounding area or region.

The diffuser 420 may also be produced in two (2) or more mechanically interchangeable versions, albeit having different graphics. For example, the graphics may be varied to indicate different trademarks or models. As another example, text may be provided in different languages, or different symbols may be provided. The desired version is identified, selected, and installed in connection with the manufacturing process.

Other embodiments and variations are also contemplated.

While the flashlight 102 has been described as containing two (2) AA-size batteries, the flashlight 102 may be configured to receive different numbers and sizes of rechargeable energy storage devices. Thus, for example, the flashlight 102 may be produced in various versions that are configured to receive one (1), two (2), or three (3) or more AAA, AA, A, C, or D-size batteries, or in versions that can accept varying numbers and/or sizes of such batteries. The dimensions of the charger 102 would likewise be adjusted to accommodate the various flashlight versions.

Moreover, the flashlight supports 122 may configured to support the flashlight head 108, for example at its generally cylindrical portion, the tapered region, or both. The flashlight supports 122 may likewise support the body 106 at an intermediate sized region where so provided on the flashlight. Note that the location of the flashlight contacts and guide bracket (if implemented) would be adjusted appropriately.

One of the flashlight supports 122 may be integral with or fixedly attached to the charger body 118; the described tapering may be omitted from one or both of the flashlight supports 122.

The surface 180 need not be planar. For example, the surface 180 may include a generally conically surface portion that partially surrounds the conical portion 116 and/or some or all of the generally cylindrical portion of the flashlight head 108.

The charger 104 may also be provided with a head holding section such as a hood or shroud configured to receive the enlarged flashlight head 108 and hence aid in the longitudinal alignment of the flashlight. Such an implementation is particularly useful where the flashlight 102 includes circumferentially extending electrical contacts or where the guide recess 204 and/or flashlight guide plate are omitted.

Various diffuse light source 120 embodiments are contemplated. The light source 120 may include two (2) or more spaced-apart LEDs, for example where additional brightness or improved illumination uniformity is desired. Separate red and green LEDs may be provided; other colors may also be used.

The diffuser 402 may also take various forms. For example, the diffuser 402 need not be hollow and may include latches or other fasteners located along its periphery for attaching to the charger body. It may also be formed from other materials. The optically diffusive property may also be provided by way or a suitable frosting or impregnation. As another example, the diffuser 402 may also take the form of a polymeric laminate sheet with suitable silk screening and/or other coatings formed thereon. It will also be appreciated that the diffuser may form an integral part of the charger body 116.

The light source 120 may be located other than at the head end of the charger 104, for example along all or part of the tail end, front, or side surfaces of the body 118. The flashlight supports 122 may also include a light pipe for illuminating the flashlight supports 122 themselves.

Light sources other than LEDs are also contemplated. Moreover, the light source may be implemented as an area source, for example in the case of an electroluminescent or similar panel.

The electrical appliance may be other than a flashlight.

Figure 5:
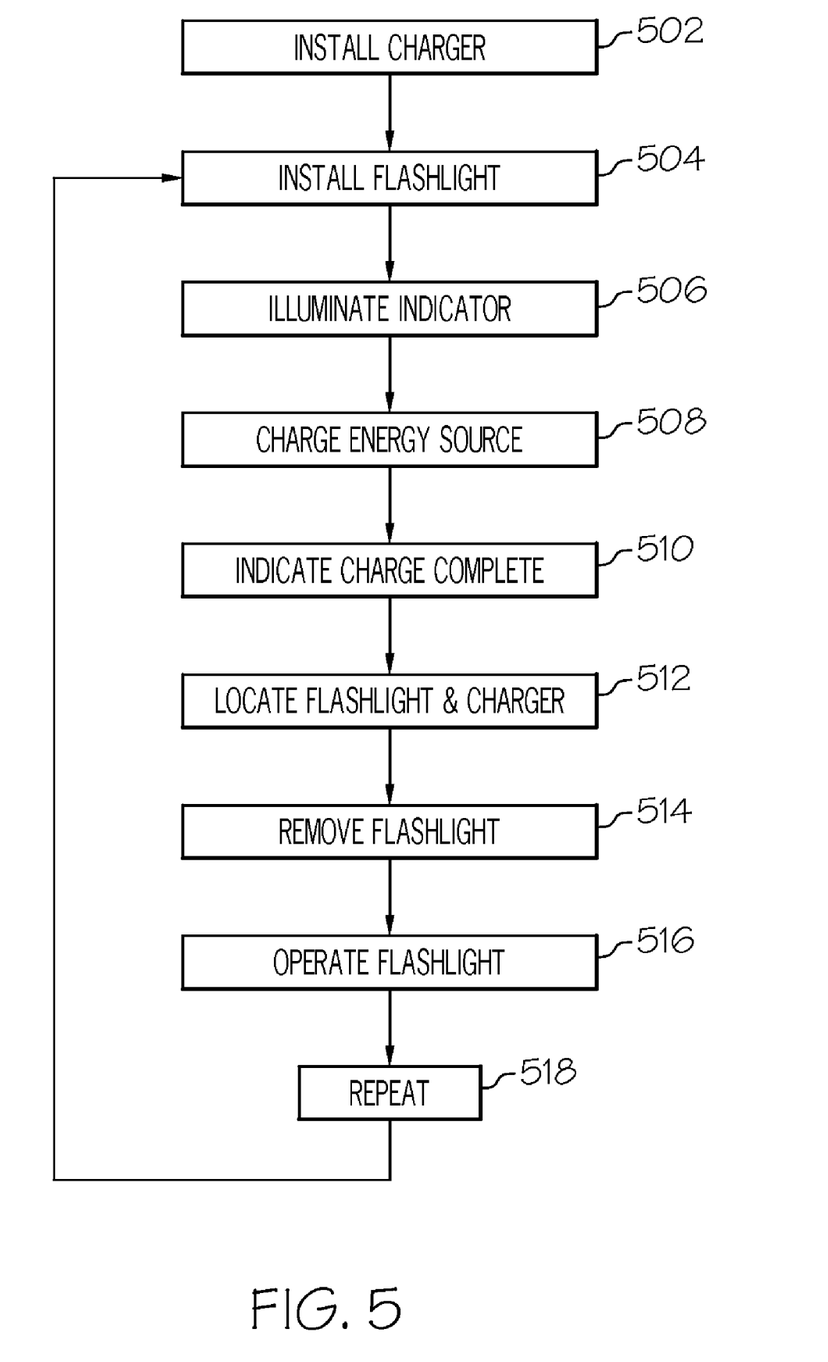
FIG. 5 depicts a method.

Operation will now be described with reference to FIG. 5.

At 502, the user installs the charger 102 at a desired location, for example in a home, commercial, industrial, vehicular, or other desired environment.

At 504, the user inserts the flashlight 102 in the charger 104 for charging, for example by pressing the flashlight body 106 rearwardly through the gap 123 in the jaws 122. Where the longitudinal dimensions 180 of the jaws 122 are relatively long in relation to the longitudinal dimension of the flashlight, the jaws 122 tend to provide the user with an improved visual and/or tactile cue that the flashlight 102 is properly aligned with the charger 102. Moreover, the tapers tend to reduce the contact area between the jaws 122 and the flashlight body 106, further aiding in the insertion.

At 506, the indicator 120 illuminates to indicate that the rechargeable energy storage device is connected to the charging circuitry, thereby providing the user with feedback that the flashlight 102 has been properly inserted. Initially, for example, the indicator 120 may glow red to indicate that the energy storage device is being charged. Where the indicator 120 is configured to illuminate an area of the charger 104, the feedback tends to be relatively more visible than that provided by a point illumination source, particularly where charger 104 is installed in a position in which the point source is obscured by the flashlight 102, the structure of the charger 104, or the user's own hand or arm. The contrast afforded by the opaque portion 162, if implemented, may also provide the user with enhanced feedback, particularly under relatively higher ambient lighting conditions.

Charging energy is applied to the rechargeable energy storage device at 508. Note that the indicator 120 preferably remains illuminated during the charging process, although the indicator 120 may blink, for example to indicate an error condition.

The indicator 120 indicates completion of charging at 510, for example by changing color from red to green.

The user locates the flashlight and charger at 512. The illumination provided by the indicator 120 may aid in locating the device, particularly under relatively low ambient light conditions. Note also that the user's ability to locate the device is enhanced if at least a portion of the indicator 120 is not obscured by the device itself or an intervening object. As the device is typically installed adjacent a wall or other surface, the illumination provided by the indicator 120 may, depending on the brightness of the indicator 120, the ambient lighting, and the characteristics of the surface, likewise illuminate at least a portion of the surface.

At 514, the user removes the flashlight 102 from the charger 104, for example by pulling forward on the flashlight body 106 so as to pull the body through the gap 123. Doing so tends to bring the conical portion 116 of the flashlight 102 into contact with the angled face of the charger 104, thus serving as a fulcrum that aids in the removal of the flashlight 102.

The user operates the flashlight at 516.

At 518, the process is repeated as desired.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A charger that charges a rechargeable energy source of a flashlight received in a flashlight receiving region of the charger, the charger comprising:
   a charger body;
   a first charger electrical contact that provides an electrical connection to a corresponding first flashlight electrical contact;
   a first longitudinally extending flashlight support; and
   a second longitudinally extending flashlight support that is located opposite the flashlight receiving region from the first support and is mounted for pivotal motion relative to the charger body, wherein the first and second supports define a flashlight receiving region radial dimension that varies linearly as a function of the longitudinal position along the first and second supports to define a longitudinally extending linear taper, the first and second supports having head ends and tail ends, wherein the radial dimension nearer to the head ends is greater than the radial dimension nearer to the tail ends.

2. The charger of claim 1 wherein the flashlight includes a generally cylindrical flashlight body and an enlarged flashlight head, the first flashlight electrical contact is located on the flashlight body, and the first and second flashlight supports support the flashlight body.

3. The charger of claim 1 wherein the flashlight includes a conical housing portion located between the flashlight body and an enlarged portion of the flashlight head, the charger includes a substantially planar, forward facing surface located behind and substantially adjacent the conical housing portion when the flashlight is received in the flashlight receiving region, the conical portion is angled away from a longitudinal axis of the flashlight at a first angle, the forward facing surface is angled away from a longitudinal axis of the flashlight receiving region at a second angle, and the first and second angles are equal, whereby the forward facing surface aids in the removal of the flashlight from the flashlight receiving region.

4. The charger of claim 1 wherein the first and second flashlight supports define a gap through which the flashlight is received and the radial dimension includes a dimension of the gap.

5. The charger of claim 1 wherein the first flashlight support is mounted for pivotal motion relative to the charger body and defines a flashlight receiving region radial dimension that varies as a function of the longitudinal position along the first flashlight support.

6. The charger of claim 1 wherein the defined radial dimension includes a minimum located between the head and tail ends.

7. The charger of claim 6 wherein the second flashlight support is fabricated using a molding process and the minimum is located at a parting line of the molding process.

8. The charger of claim 7 wherein the charger includes a head end facing flashlight alignment recess and the minimum is located between a head end and a tail end of the alignment recess.

9. The charger of claim 6 wherein the charger includes a second charger electrical contact that is longitudinally displaced from the first electrical contact and makes an electrical connection with a corresponding second flashlight electrical contact, and wherein the minimum is located between the first and second electrical contacts.

10. The charger of claim 1 wherein the second support includes a flashlight receiving region facing portion and a head end, and wherein the flashlight receiving region facing portion includes a head end facing radial taper.

11. The charger of claim 10 wherein the second support includes a tail end, and wherein the flashlight receiving region facing portion includes a tail end facing taper.

12. The charger of claim 1 wherein the flashlight includes a body, the first and second flashlight supports support the flashlight body in the flashlight receiving region and include spaced apart, forward portions that form an opening through which the flashlight is received, and wherein the longitudinal dimensions of the forward portions are greater than or equal to about 25% of the longitudinal dimension of the flashlight body.

13. The charger of claim 1, the charger body further comprising an arcuate wall behind and facing the flashlight receiving region defined by the first and second longitudinally extending flashlight supports.

14. The charger of claim 1, the first and second longitudinally extending flashlight supports defining the flashlight receiving region that receives only a cylindrical body of a flashlight.

15. The charger of claim 1, the radial dimension at the tail ends of the support being zero.

16. The charger of claim 1, wherein the first and second supports are configured to extend partially circumferentially around a flashlight and define a forwardly facing gap, wherein the gap at a location nearer to the head ends is greater than the gap at a location nearer to the tail ends.

17. The charger of claim 1, wherein the linear taper has an angle in the range of 1 to 3 degrees.

18. A charger that charges a rechargeable energy source of a flashlight received in a flashlight receiving region of the charger, the charger comprising:
   a charger body;
   a first charger electrical contact that provides an electrical connection to a corresponding first flashlight electrical contact;
   a first longitudinally extending flashlight support; and
   a second longitudinally extending flashlight support that is located opposite the flashlight receiving region from the first support and is mounted for pivotal motion relative to the charger body, wherein the second support defines a flashlight receiving region radial dimension that varies linearly as a function of the longitudinal position along the second support to define a longitudinally extending linear taper, the second support having a head end and a tail end, wherein the radial dimension at the head end is greater than the radial dimension nearer to the tail end.

19. The charger of claim 18, wherein the first and second supports are configured to extend partially circumferentially around a flashlight and define a forwardly facing gap, wherein the gap at a location nearer to the head end is greater than the gap at a location nearer to the tail end.

20. The charger of claim 18, wherein the linear taper has an angle in the range of 1 to 3 degrees.

21. A charger that charges a rechargeable energy source of a flashlight received in a flashlight receiving region of the charger, the charger comprising:
- a charger body;
- a first charger electrical contact that provides an electrical connection to a corresponding first flashlight electrical contact;
- a first longitudinally extending flashlight support; and
- a second longitudinally extending flashlight support that is located opposite the flashlight receiving region from the first support and is mounted for pivotal motion relative to the charger body, wherein the first and second supports define a flashlight receiving region radial dimension that varies linearly as a function of the longitudinal position along the first and second supports to define a longitudinally extending linear taper such that the first and second supports extend partially circumferentially around a flashlight and define a forwardly facing gap, wherein the gap nearer to a head end of the flashlight is greater than the gap nearer to a tail end of the flashlight.

22. The charger of claim 21, wherein the linear taper has an angle in the range of 1 to 3 degrees.

* * * * *